Patented Nov. 28, 1939

2,181,531

UNITED STATES PATENT OFFICE 2,181,531

PROCESS FOR THE PRODUCTION OF DINITRO DERIVATIVES OF SATURATED NON-BENZENOID HYDROCARBONS

Henry B. Hass and Leon W. Seigle, La Fayette, Ind., assignors to Purdue Research Foundation, La Fayette, Ind., a corporation of Indiana No Drawing. Application November 16, 1938, Serial No. 240,662

5 Claims. (Cl. 260—644)

Our invention pertains to a method of producing dinitro compounds, and more especially to the production of dinitro derivatives of saturated non-benzenoid hydrocarbons.

According to our invention we effect a reaction between a salt of a secondary nitro derivative of a saturated non-benzenoid hydrocarbon, and a secondary halo-nitro derivative of a saturated non-benzenoid hydrocarbon having the halogen and the nitro group on the same carbon atom. The mechanism of this reaction may be represented as follows:

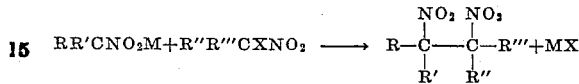

In this equation M is a metal, preferably an alkali or alkaline earth metal, and X represents a halogen. The configuration R—C—R' may be chosen from the following:

(1) R and R' represent alkyl groups
(2) R and R' represent cycloalkyl groups
(3) R represents an alkyl group and R' represents a cycloalkyl group
(4) R—C—R' represents a cycloalkylidene group.

Similarly, the configuration R"—C—R'" may be chosen from the following:

(1) R" and R'" represent alkyl groups
(2) R" and R'" represent cycloalkyl groups
(3) R" represents an alkyl group and R'" represents a cycloalkyl group
(4) R"—C—R'" represents a cycloalkylidene group.

The condensation of the metal salt of the secondary nitro compound and the secondary halonitro compound may conveniently be effected in various ways. A preferred method consists of gently heating substantially equimolecular proportions of the two reactants in a suitable solvent medium and separating the resulting dinitro compound from the resulting reaction mixture by filtration, extraction or distillation, depending upon the relative properties of the particular dinitro compound and the raw materials from which it was produced.

While any metal salt of the nitro compound which readily reacts with the halogen compound to form a metal halide may be used in our process, we prefer to use the alkali and alkaline earth metal salt of such compounds due to the ease with which they may be produced and the readiness with which they enter into the desired reaction. These salts, for example, may be obtained by adding the required amount of base to the nitro compound, preferably in the form of a solution, the resulting crude reaction mixture being suitable for use in our process, in case the pure material is not readily available. A suitable solution of the sodium salt of 2-nitropropane, for example, may be obtained by adding 2-nitropropane to a solution of sodium hydroxide in 50 per cent alcohol. Or, if desired in the form of pure dried salt, the sodium salt of 2-nitropropane may be prepared by adding sodium to absolute alcohol, followed by the addition of 2-nitropropane in absolute ether, and filtration and drying of the solid salt obtained.

Suitable methods of obtaining the halogen compounds of the secondary nitro derivatives used in our process are illustrated by the following methods of producing 2-chloro-2-nitropropane, 2-iodo-2-nitropropane, and 2-bromo-2-nitropropane: 2-nitropropane was stirred with an aqueous solution of sodium hydroxide until all of the nitro compound was dissolved. To prepare the chloro compound, the resulting solution of the sodium salt of 2-nitropropane was then cooled and chlorine bubbled into the solution while vigorously stirring. The resulting 2-chloro-2-nitropropane separated as an oil which was washed with a sodium hydroxide solution, then with water, and finally dried over anhydrous calcium chloride and rectified. To prepare the iodo compound, an aqueous solution of iodine and potassium iodide was added to the cooled solution of the sodium salt of 2-nitropropane, with vigorous stirring. The bromo compound was prepared by dropping bromine, in liquid form, into the cooled solution of the sodium salt of 2-nitropropane. In all cases one mole of halogen was introduced per mole of the nitroparaffin.

In preparing dinitro compounds from metal salts of secondary nitro compounds and secondary halo-nitro compounds of the types herein referred to, equimolecular proportions of the two materials, obtained as above described, or by other suitable means are condensed by heating together in a suitable solvent medium. The following specific examples will illustrate the preparation of a number of dinitro compounds by our methods, employing different starting materials of the classes above mentioned. It should be understood, however, that our process is in no way limited to the preparation of these specific compounds, nor to the specified starting materials and operating conditions cited, but is broadly applicable to the production of dinitro derivatives of saturated non-benzenoid hydrocarbons from metal salts of secondary nitro derivatives of saturated non-benzenoid hydrocarbons and secondary halonitro derivatives of saturated non-benzenoid hydrocarbons.

Example I

A tenth of a mol of the sodium salt of 2-nitropropane was refluxed with a tenth of a mol of 2-chloro-2-nitropropane and 100 ml. of absolute alcohol for 7 hours. At the end of this time the reaction mixture was cooled resulting in the formation of a white crystalline solid which was filtered and recrystallized from absolute alcohol. This material on analysis was shown to be the desired 2,3-dimethyl-2,3-dinitrobutane. The conversion was approximately 9%, based on the weight of the 2-chloro-2-nitropropane employed.

Example II 2-nitropropane (0.2 mol) was added to a solution of sodium hydroxide in 80 ml. of 50% alcohol. The resulting alkaline solution was then slowly added to a refluxing solution of 2-bromo-2-nitropropane (0.2 mol) in alcohol over a period of 3½ hours. The resulting reaction mixture was then cooled and diluted with a small amount of water, causing the separation of 2,3-dimethyl-2,3-dinitrobutane, which was purified by recrystallization from alcohol. The conversion to the dinitro compound was 29%, based on the weight of the 2-bromo-2-nitropropane employed.

Example III

A tenth of a mol of 2-nitropropane was dissolved in 100 ml. of 80% alcohol containing a tenth of a mol of sodium hydroxide. A tenth of a mol of crude 2-iodo-2-nitropropane was then added to the solution and the whole refluxed for a period of one hour. The conversion to 2,3-dimethyl-2,3-dinitrobutane amounted to 37%, based on the weight of the 2-iodo-2-nitropropane employed.

Example IV 2-nitrobutane (0.2 mol) was dissolved in 100 ml. of 80% alcohol containing sodium hydroxide (0.2 mol) and 2-iodo-2-nitrobutane (0.2 mol) was slowly added to the refluxing alkaline solution over a period of 2 hours. The resulting 3,4-dimethyl-3,4-dinitrohexane separated as white flakes, which were purified by recrystallization. A 34% conversion was obtained, based on the weight of the 2-iodo-2-nitrobutane employed.

Example V 2-nitrobutane (0.2 mol) was dissolved in 100 ml. of 80% alcohol containing 0.2 mol of sodium hydroxide. Two-tenths of a mol of 2-bromo-2-nitropropane was added to the alkaline solution and the resulting solution refluxed for a period of three hours. An 8% conversion to 2,3-dimethyl-2,3-dinitropentane was obtained, based on the weight of the 2-bromo-2-nitropropane employed.

Example VI

Nitrocyclohexane (0.1 mol) was dissolved in 75 ml. of 80% alcohol containing 0.1 mol of sodium hydroxide and refluxed with 0.1 mol of 2-bromo-2-nitropropane for three hours. A 19% conversion to 1-nitro-1-(2-nitroisopropyl)-cyclohexane was obtained in the form of a white solid which was purified by dissolving in acetone, filtering, precipitating by the addition of water, followed by recrystallization from alcohol.

In the examples cited above only the sodium salts of the nitro compounds have been employed. The process, however, is not limited to the use of the sodium salts, since potassium, calcium, barium, or other metal salts may likewise be satisfactorily employed.

Both aqueous and absolute alcohol have been used in the examples. Other suitable solvents are methanol, acetone and glycerol. In general it may be said that any organic or aqueous-organic liquid which is chemically inert in the reaction mixture and is a solvent for both of the reactants may satisfactorily be employed. However, high boiling solvents are less desirable, since the reflux temperature of the mixture may be sufficiently high to give rise to undesirable side reactions. In such cases, temperature control below the reflux temperature of the mixture would be required for maximum yields, and it is therefore easier to employ a lower boiling solvent and effect the reaction at the reflux temperature. It should also be noted that the reaction may be carried out without any solvent whatever. We prefer, however, to utilize a solvent in all cases to avoid explosion hazards, and to secure improved yields.

The dinitroparaffins produced in accordance with our invention are useful for various purposes and are particularly valuable as intermediates for the synthesis of diamines which can be used in the manufacture of insecticides and emulsifying and wetting agents.

It should be understood, of course, that any modifications of procedure, and the use of any equivalents, which would naturally occur to those skilled in the art are included in the scope of our invention.

Now having described our invention, what we claim is:

1. Process for the production of a dinitro derivative of a saturated non-benzenoid hydrocarbon which comprises condensing a salt of a secondary nitro derivative of a saturated non-benzenoid hydrocarbon with a secondary halo-nitro derivative of a saturated non-benzenoid hydrocarbon having the halogen and the nitro group on the same carbon atom.

2. Process for the production of a dinitroparaffin which comprises condensing a salt of a secondary nitroparaffin with a secondary halo-nitroparaffin having the halogen and the nitro group on the same carbon atom.

3. Process for the production of a saturated non-benzenoid dinitrohydrocarbon which comprises condensing a salt of a nitrocycloparaffin with a secondary halo-nitroparaffin having the halogen and the nitro group on the same carbon atom.

4. Process for the production of a saturated non-benzenoid dinitrohydrocarbon which comprises refluxing in the presence of a solvent therefor, a salt of a saturated non-benzenoid secondary nitrohydrocarbon and a saturated non-benzenoid secondary halo-nitrohydrocarbon having the halogen and the nitro group on the same carbon atom.

5. Process for the production of a dinitroparaffin which comprises refluxing in the presence of a solvent therefor, a salt of a secondary nitroparaffin and a secondary halo-nitroparaffin having the halogen and the nitro group on the same carbon atom.

HENRY B. HASS.
LEON W. SEIGLE.